(12) United States Patent
Merems et al.

(10) Patent No.: US 11,796,291 B2
(45) Date of Patent: Oct. 24, 2023

(54) EFFECTOR HAVING MORPHING AIRFRAME AND METHOD

(71) Applicant: Raytheon Company, Waltham, MA (US)

(72) Inventors: Paul A. Merems, Tucson, AZ (US); Shawn Patrick Burke, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/842,200

(22) Filed: Jun. 16, 2022

(65) Prior Publication Data

US 2023/0221101 A1    Jul. 13, 2023

Related U.S. Application Data

(60) Provisional application No. 63/298,362, filed on Jan. 11, 2022.

(51) Int. Cl.
| | |
|---|---|
| *F42B 10/38* | (2006.01) |
| *F42B 10/00* | (2006.01) |
| *F42B 10/42* | (2006.01) |
| *F42B 5/10* | (2006.01) |
| *F42B 10/14* | (2006.01) |
| *F02K 7/10* | (2006.01) |

(52) U.S. Cl.
CPC ............... *F42B 10/42* (2013.01); *F02K 7/10* (2013.01); *F42B 5/10* (2013.01); *F42B 10/14* (2013.01)

(58) Field of Classification Search
CPC .......... F42B 10/32; F42B 10/38; F42B 10/18; F42B 10/14; F42B 10/20; F42B 14/06
See application file for complete search history.

(56) References Cited

U.S. PATENT DOCUMENTS

| | | | | |
|---|---|---|---|---|
| 229,499 | A * | 6/1880 | Turner | F42B 10/44 |
| | | | | 102/494 |
| 431,210 | A * | 7/1890 | Lassoe | F42B 19/26 |
| | | | | 114/23 |
| 656,933 | A * | 8/1900 | Brown | F42B 10/44 |
| | | | | 244/3.3 |
| 2,426,239 | A * | 8/1947 | Renner | F42B 5/10 |
| | | | | 102/439 |

(Continued)

FOREIGN PATENT DOCUMENTS

| | | | | |
|---|---|---|---|---|
| DE | 3327945 A | * | 2/1985 | ............. F42B 15/00 |
| RU | 2671262 C1 | * | 10/2018 | |

*Primary Examiner* — Derrick R Morgan
(74) *Attorney, Agent, or Firm* — Renner, Otto, Boisselle & Sklar

(57) ABSTRACT

An effector having an extendible range and a method for extending the range of an effector includes using an axially translatable center body that is movable from a stowed position, in which the center body is stowed in an outer body of the effector, to a deployed position in which the center body extends out of the outer body to extend the axial length of the effector. The effector includes a ramjet assembly and the subsystems of the effector are contained in the center body. The movement of the center body exposes radially positioned ramjet fuel in the outer body, such that the air entering the ramjet inlet may be heated by combusting the air with the fuel for additional fuel and propulsion of the effector.

22 Claims, 3 Drawing Sheets

(56) References Cited

U.S. PATENT DOCUMENTS

| | | | | |
|---|---|---|---|---|
| 2,510,110 A * | 6/1950 | Hickman | F42B 15/00 | 60/201 |
| 2,700,337 A * | 1/1955 | Cumming | F42B 10/14 | 244/3.28 |
| 2,821,924 A * | 2/1958 | Hansen | F42B 10/14 | 244/3.28 |
| 2,935,946 A * | 5/1960 | Gallo | F02K 7/10 | 102/374 |
| 3,024,729 A * | 3/1962 | Kluge | F42B 5/10 | 60/767 |
| 3,098,446 A * | 7/1963 | Jasse | F42B 10/20 | 244/3.28 |
| 3,139,794 A * | 7/1964 | Barnes, Jr. | F42B 10/56 | 102/377 |
| 3,292,879 A * | 12/1966 | Willard | F42B 29/00 | 244/3.3 |
| 3,347,491 A * | 10/1967 | Auguste | F42B 10/12 | 102/400 |
| 3,842,741 A * | 10/1974 | Brothers | F42B 12/625 | 102/490 |
| 3,853,288 A * | 12/1974 | Bode | F42B 10/16 | 244/3.29 |
| 4,327,885 A * | 5/1982 | Blevins | F42B 10/64 | 60/768 |
| 4,327,886 A * | 5/1982 | Bell | F42B 10/64 | 60/245 |
| 4,502,649 A * | 3/1985 | Botwin | F02C 7/057 | 60/768 |
| 4,674,706 A * | 6/1987 | Hall | F42B 10/44 | 102/489 |
| 4,944,226 A * | 7/1990 | Wedertz | F42B 10/18 | 102/306 |
| 5,029,773 A * | 7/1991 | Lecat | F41J 9/10 | 244/3.28 |
| 6,126,109 A * | 10/2000 | Barson | F42B 10/14 | 244/3.28 |
| 6,234,082 B1 * | 5/2001 | Cros | F42B 14/02 | 102/520 |
| 6,336,609 B1 * | 1/2002 | Johnsson | F42B 10/16 | 102/490 |
| 6,454,205 B2 * | 9/2002 | Niemeyer | F42B 10/20 | 244/3.28 |
| 6,886,775 B2 * | 5/2005 | Johnsson | F42B 10/16 | 102/385 |
| 7,854,410 B2 * | 12/2010 | Fanucci | B64C 39/024 | 244/49 |
| 8,079,308 B1 * | 12/2011 | Chevalier | F02K 9/34 | 60/245 |
| 8,312,813 B2 * | 11/2012 | McDermott | F42B 10/44 | 102/490 |
| 9,823,053 B1 * | 11/2017 | Fink | F42B 15/00 | |
| 10,184,762 B2 * | 1/2019 | Summers | F42B 10/38 | |
| 10,254,094 B1 * | 4/2019 | Harrison | F42B 10/46 | |
| 10,422,612 B2 * | 9/2019 | Osdon | F42B 12/18 | |
| 2003/0146342 A1 * | 8/2003 | Hellman | F42B 10/40 | 244/3.27 |
| 2004/0011919 A1 * | 1/2004 | Johnsson | F42B 10/18 | 244/3.29 |
| 2004/0108412 A1 * | 6/2004 | Moore | F42B 10/38 | 244/3.24 |
| 2008/0041265 A1 * | 2/2008 | Geswender | F02K 7/10 | 102/476 |
| 2011/0297783 A1 * | 12/2011 | Martinez | F42B 15/01 | 244/3.21 |
| 2012/0210901 A1 * | 8/2012 | Bender | F42B 10/16 | 244/3.29 |
| 2014/0251295 A1 * | 9/2014 | Flint | F42B 6/02 | 473/578 |
| 2014/0251296 A1 * | 9/2014 | Flint | F42B 10/38 | 473/577 |
| 2021/0333074 A1 * | 10/2021 | Merems | F42B 10/14 | |
| 2022/0018377 A1 * | 1/2022 | Travis | F16B 19/002 | |
| 2022/0146240 A1 * | 5/2022 | Battaglia | F42B 5/08 | |

* cited by examiner

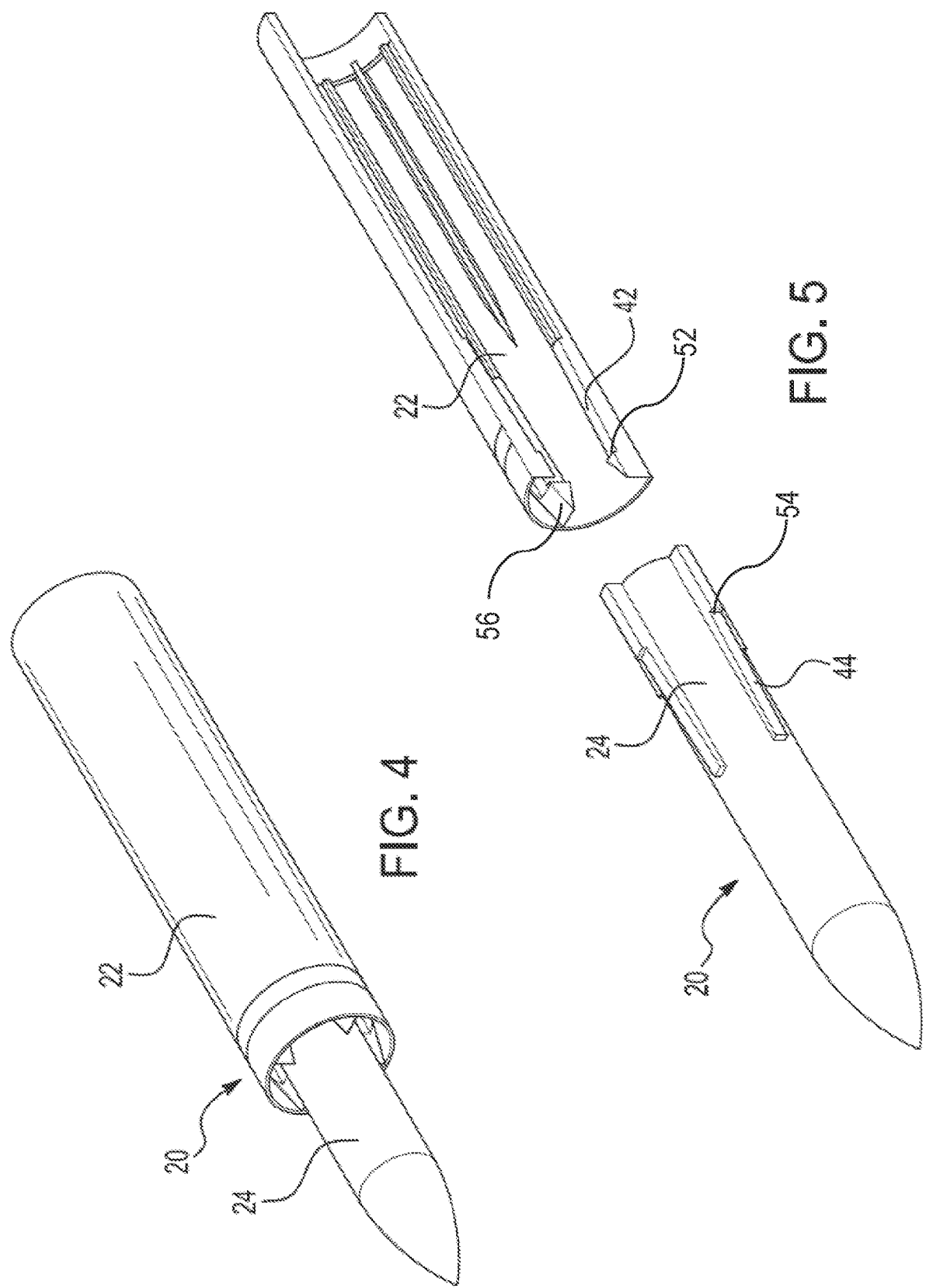

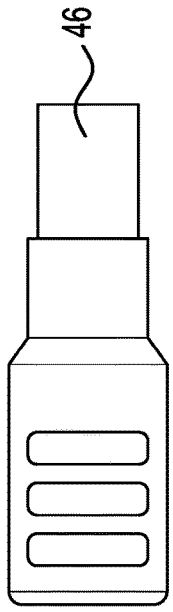
FIG. 6A
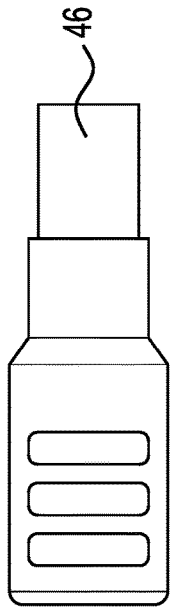
FIG. 6B
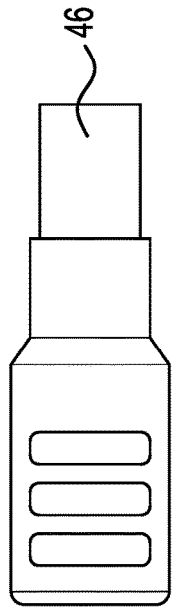
FIG. 6C
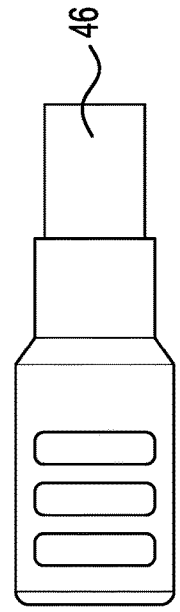
FIG. 6D
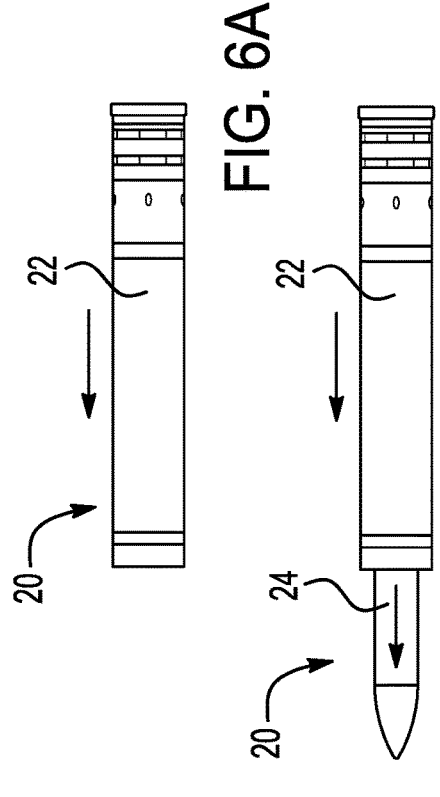
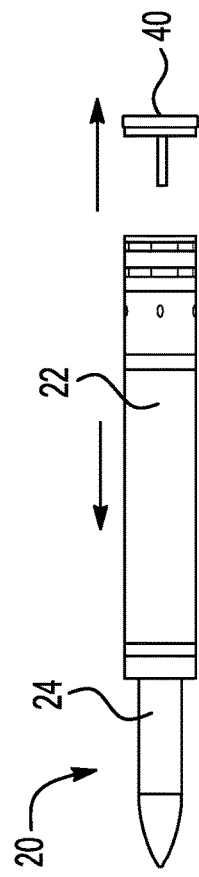
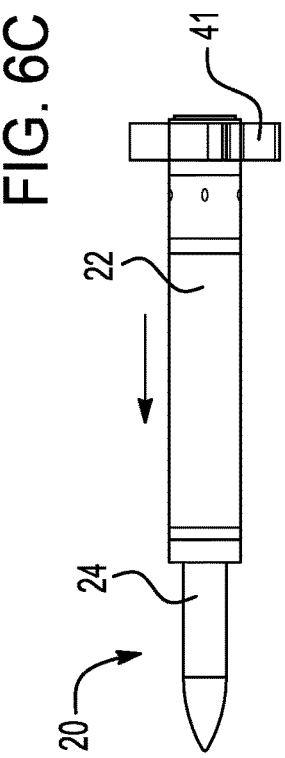

EFFECTOR HAVING MORPHING AIRFRAME AND METHOD

RELATED APPLICATION

This application claims the benefit of U.S. Provisional Application No. 63/298,362, filed Jan. 11, 2022, which is hereby incorporated herein by reference in its entirety.

FIELD OF DISCLOSURE

The disclosure relates to an effector having an extendable range and a method of extending the range of an effector.

DESCRIPTION OF THE RELATED ART

Various applications use effectors. Exemplary applications include military applications that use effectors, such as projectiles or missiles. Other non-military applications or commercial applications may also use effectors. Extending the range of an effector may be challenging. One prior attempt to increase the effector range includes increasing the powder charge. However, increasing the powder charge may be limited due to excessive setback acceleration g's and a maximum allowable launcher pressure.

Another prior attempt to increase the range of an effector includes adding a rocket motor, wings, and ramjet to the system. Using a ramjet is advantageous in adding a propulsion system to the effector, but conventional ramjets place the fuel behind subsystems of the effector, e.g., Seeker, Guidance Electronics Unit (GEU), Control Actuation System (CAS), Warhead, etc., and the effector may also be limited in length due to launch constraints (host airframe, gun systems, launcher, and loading equipment requirements). Additionally, ramjet ducting requires additional volume in the effector which may provide packaging limitations.

SUMMARY OF THE DISCLOSURE

The present application provides an effector having an extendible range. The effector has a telescoping airframe formed of an axially translatable center body that is movable from a stowed position, in which the center body is stowed within an outer body of the effector, to a deployed position in which the center body extends out of the outer body to extend the axial length of the effector. The subsystems of the effector are contained in the center body. The effector further includes a ramjet assembly. The movement of the center body exposes radially positioned ramjet fuel in the outer body to provide additional fuel and thus propulsion for the effector, such that the range for the effector is increased.

According to an aspect of the disclosure, an effector has a telescoping airframe to extend an axial length of the effector.

According to an aspect of the disclosure, an effector has an axially translatable center body that is movable relative to an outer body.

According to an aspect of the disclosure, an effector has an axially translatable center body that is movable relative to an outer body and contains a plurality of subsystems of the effector.

According to an aspect of the disclosure, an effector has an axially translatable center body that is movable to expose radially positioned ramjet fuel.

According to an aspect of the disclosure, an effector has a ramjet assembly and a telescoping airframe that is movable for fluid communication with a ramjet fuel chamber and a ramjet inlet for additional fuel for the effector.

According to an aspect of the disclosure, an effector has an axially translatable center body that is movable relative to an outer body and includes deployable control surfaces in addition to deployable fins of the outer body.

According to an aspect of the disclosure, an effector has an outer body and an axially translatable center body that each include mechanical locking interfaces.

According to an aspect of the disclosure, an effector has an outer body and an axially translatable center body that have conical locking interfaces.

According to an aspect of the disclosure, a gun-launched effector assembly includes a launcher and an effector that is fired from the launcher, the effector having an outer body and a center body that is movable from a stowed position, in which the outer body is stowed within the outer body, to a deployed position, in which the center body is moved out of the outer body to extend an axial length of the effector, the center body moving from the stowed position to the deployed position after an exit of the effector from the launcher.

According to an aspect of the disclosure, a method of increasing a range of an effector includes axially translating a center body relative to an outer body of the effector to extend an axial length of the effector.

According to an aspect of the disclosure, a method of increasing a range of an effector includes axially translating a center body relative to an outer body of the effector to expose radially positioned ramjet fuel that provides additional fuel for a ramjet assembly.

According to another aspect of the disclosure, an effector includes: an outer body; and a center body movable from a stowed position, in which the center body is stowed in the outer body, to a deployed position, in which the center body extends out of the outer body to extend an axial length of the effector.

According to an embodiment of any paragraph(s) of this summary, the center body is axially translatable relative to the outer body.

According to an embodiment of any paragraph(s) of this summary, the effector includes a ramjet assembly.

According to an embodiment of any paragraph(s) of this summary, the outer body contains a ramjet fuel chamber that is opened when the center body is moved to the deployed position.

According to an embodiment of any paragraph(s) of this summary, the ramjet fuel chamber is formed as an axially extending chamber that is radially spaced from a longitudinal axis of the effector.

According to an embodiment of any paragraph(s) of this summary, the center body and the outer structure have corresponding interfaces that engage when the center body is moved to the deployed position to lock the center body and the outer structure together.

According to an embodiment of any paragraph(s) of this summary, the corresponding interfaces are formed as conical interfaces that have a tapering shape in an axial direction.

According to an embodiment of any paragraph(s) of this summary, the conical interfaces are circumferentially spaced about a longitudinal axis of the effector.

According to an embodiment of any paragraph(s) of this summary, the conical interfaces of the outer body are arranged at a forward end of the outer body and the conical interfaces of the center body are arranged at an aft end of the center body.

According to an embodiment of any paragraph(s) of this summary, the effector further includes a ramjet inlet having ducting.

According to an embodiment of any paragraph(s) of this summary, the ducting is arranged proximate an aft end of the center body when the center body is moved to the deployed position.

According to an embodiment of any paragraph(s) of this summary, an aft portion of the center body is arranged radially inwardly relative to the ramjet ducting and includes locking interfaces that engage with corresponding locking interfaces of the outer body when the center body is moved to the deployed position.

According to an embodiment of any paragraph(s) of this summary, the aft portion of the center body is surrounded by the outer body when the center body is in the deployed position.

According to an embodiment of any paragraph(s) of this summary, the ramjet inlet is in fluid communication with a ramjet fuel chamber arranged in the outer body when the center body is in the deployed position.

According to an embodiment of any paragraph(s) of this summary, the center body includes deployable control surfaces that are deployed when the center body moves to the deployed position.

According to an embodiment of any paragraph(s) of this summary, the center body includes a plurality of subsystems of the effector.

According to an embodiment of any paragraph(s) of this summary, the center body includes at least one of a warhead subsystem, a seeker subsystem, a Guidance Electronics Unit (GEU), or a Control Actuation System (CAS).

According to an embodiment of any paragraph(s) of this summary, the center body moves in a forward direction relative to a direction of travel of the effector.

According to an embodiment of any paragraph(s) of this summary, an axial length of the center body is more than half of an axial length of the outer body.

According to an embodiment of any paragraph(s) of this summary, the effector further includes a pusher plate that is released from an aft end of the effector after the center body moves to the deployed position.

According to an embodiment of any paragraph(s) of this summary, the effector includes fins that are arranged at the aft end of the effector and are deployed after the pusher plate is released.

A gun-launched effector assembly includes an effector according to any paragraph(s) of this summary.

According to an aspect of the disclosure, a gun-launched effector assembly includes: a launcher; and an effector that is fired from the launcher, the effector having an outer body and a center body that is movable from a stowed position, in which the outer body is stowed in the outer body, to a deployed position, in which the center body is moved out of the outer body to extend an axial length of the effector, the center body moving from the stowed position to the deployed position after a muzzle exit of the effector from the launcher.

According to an embodiment of any paragraph(s) of this summary, the effector includes a pusher plate that is released after the center body moves to the deployed position.

According to an embodiment of any paragraph(s) of this summary, the effector includes fins that are deployed after the pusher plate is released.

According to an aspect of the disclosure, a method of increasing a range of an effector includes axially translating a center body relative to an outer body of the effector to extend an axial length of the effector.

According to an embodiment of any paragraph(s) of this summary, the method further includes moving the center body after exit of the effector from a launcher.

According to an embodiment of any paragraph(s) of this summary, the method further includes opening a ramjet fuel chamber for fluid communication with a ramjet duct of the effector via movement of the center body relative to the outer body.

According to an embodiment of any paragraph(s) of this summary, the method further includes mechanically locking the center body and the outer body after the center body has moved outwardly from the center body to a deployed position.

According to an embodiment of any paragraph(s) of this summary, the method further includes deploying control surfaces of the center body after the center body has moved outwardly from the center body to a deployed position.

According to an embodiment of any paragraph(s) of this summary, the method further includes releasing a pusher plate of the effector after the center body has moved outwardly from the center body to a deployed position.

According to an embodiment of any paragraph(s) of this summary, the method further includes deploying fins of the effector after the pusher plate is released.

According to another aspect of the disclosure, an effector includes a telescoping airframe configured to extend an axial length of the effector.

According to another aspect of the disclosure, an effector includes a ramjet assembly and a telescoping airframe configured to expose a ramjet fuel chamber.

According to another aspect of the disclosure, an effector includes a telescoping airframe including an outer body and an axially translatable center body, wherein the axially translatable center body has integrally formed locking surfaces that are engageable with corresponding locking surfaces that are integrally formed on the outer body.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description of the disclosure when considered in conjunction with the drawings.

BRIEF DESCRIPTION OF DRAWINGS

The annexed drawings, which are not necessarily to scale, show various aspects of the disclosure.

FIG. 4 shows an oblique view of the outer body and the center body of FIG. 1.

FIG. 5 shows an exploded oblique view of the outer body and the center body of FIG. 1.

FIG. 6A shows a first step in a launch sequence of the effector of FIG. 1 from a launcher (in this case a gun).

FIG. 6B shows a second step in the launch sequence.

FIG. 6C shows a third step in the launch sequence.

FIG. 6D shows a fourth step in the launch sequence.

DETAILED DESCRIPTION

The principles described herein have particular application in effector and effector deployment systems, such as in tube-launched or gun-launched projectiles or missiles and launcher. The effector and method of deploying the center body described herein may be suitable for use in military applications. Non-lethal applications and non-military applications may also be suitable, such as surveillance systems. The effector is suitable for deployment in any environment and may be carried on any suitable platform. Exemplary environments include air, space, and sea, and exemplary platforms include aircraft, hypersonic or supersonic vehicles, land vehicles, or watercraft.

Figure 1:
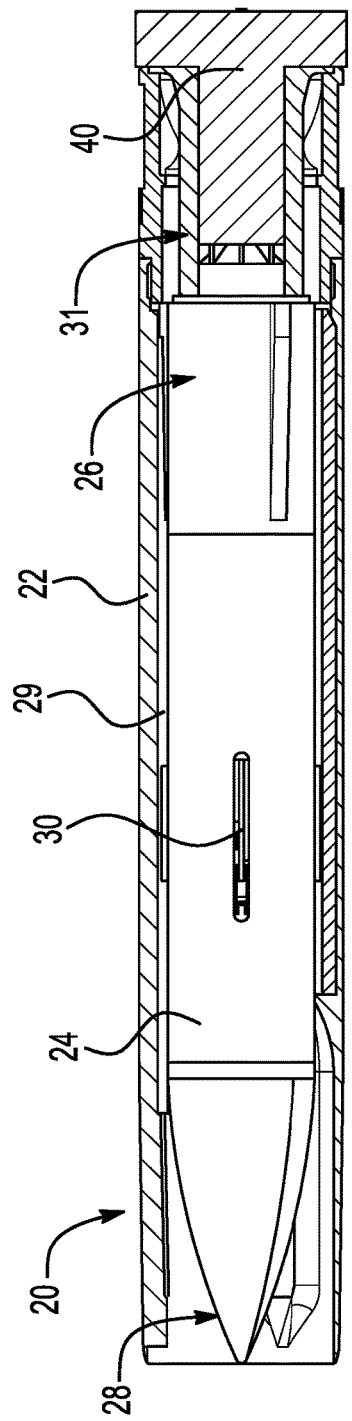
FIG. 1 shows a cross-sectional view of an effector having an outer body and an axially translatable center body that is in a stowed position in which the center body is stowed within the outer body.

Referring first to FIG. 1, an effector 20 has an outer body 22 and a center body 24. Each of the outer body 22 and the center body 24 may be formed as an elongated cylindrical body. The center body 24 is movable from a stowed position in which the center body 24 is stowed in the outer body 22, as shown in FIG. 1, to a deployed position, in which the center body 24 is moved out of the outer body 22 to extend an axial length of the effector 20. The center body 24 may be axially translatable relative to the outer body 22 and movable in a forward direction relative to the direction of travel of the effector 20. The movement of the center body 24 relative to the outer body 24 may provide a telescoping-type arrangement for the airframe of the effector 20.

The effector 20 may include a ramjet assembly 26. The ramjet assembly 26 may be defined by a ramjet inlet formed in the outer body 24 that receives airflow during flight of the effector 20. The center body 24 may include any number of subsystems of the effector 20. For example, the center body 24 may include at least one of a warhead subsystem 28, a seeker subsystem, a Guidance Electronics Unit (GEU), or a Control Actuation System (CAS). In exemplary embodiments, all of the subsystems of the effector 20 may be contained in the center body 24, such that all of the subsystems are shifted with the center body 24. In exemplary embodiments, the effector 20 may include a rocket motor such that the effector 20 is rocket assisted. Many other subsystems may be suitable and the subsystems implemented in the effector 20 may be dependent on the application.

Advantageously, the translating center body 24 is stowed within the defined length of the effector 20. The center body 24 is translated forward within the outer body 22 immediately after a muzzle exit of the effector 20 from a gun to extend the axial length of the effector 20. The movement of the center body 24 also exposes or opens a radially positioned ramjet fuel chamber to enable additional fuel to be provided to a ramjet of the effector 20. Accordingly, a range of the effector 20 is extended using a telescoping or morphing airframe that is able to fit within the existing packaging requirements of the effector 20. The translating center body configuration increases the fuel gain mass and length by packaging fuel where the air ducts of traditional systems would be located, which significantly increases the effector range.

The outer diameter of the center body 24 may match an inner diameter of the outer body 22 such that the center body 24 is centered in the outer body 22 as the center body 24 moves through the outer body 22. The center body 24 may include locating or guide features 29 formed on an outer periphery of the effector 20. The locating or guide features 29 are engageable with a corresponding feature of the outer body 22 to enable movement of the center body 24 along the outer body 22. The locating or guide features may include any suitable tabs, ribs, protrusions, rails, guides, grooves, etc. The locating or guide features may have any suitable shape.

An axial length of the center body 24 may be more than half of an axial length of the outer body 22. The axial length of the center body 24 is less than the entire axial length of the outer body 22. An entire axial length of the center body 24 may be encompassed and surrounded by the outer body 22 when the center body 24 is in the stowed position shown in FIG. 1. The center body 24 may include a plurality of control surfaces 30 that are disposed on an outer periphery of the center body 24 and retained in a folded position against the center body 24 when the center body 24 is in the stowed position.

Figure 2:
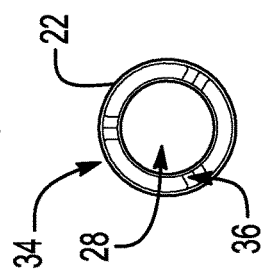
FIG. 2 shows a forward view of a ramjet inlet for the effector of FIG. 1.
Figure 3:
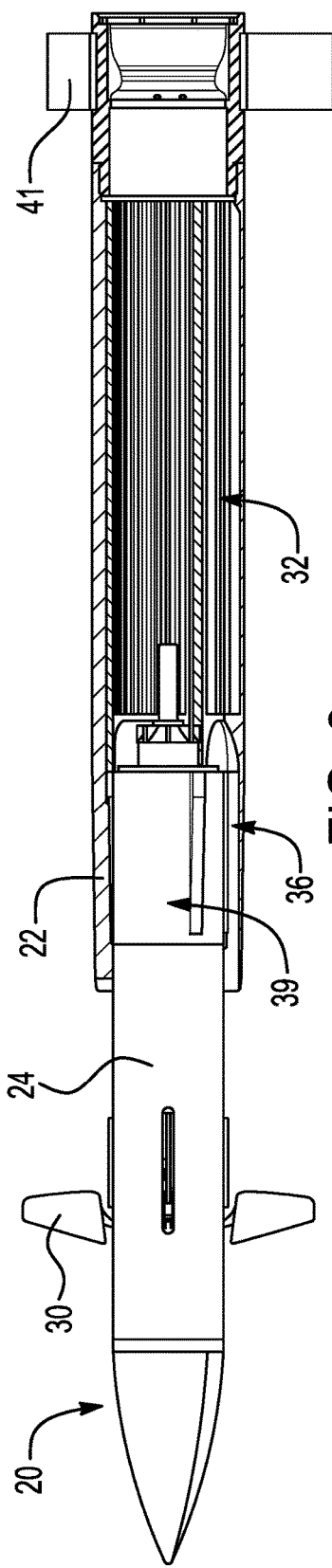
FIG. 3 shows the effector of FIG. 1 having the center body in a deployed position in which the center body has moved out of the outer body to extend an axial length of the effector.

Referring in addition to FIGS. 2 and 3, the center body 24 is axially translatable to the deployed position shown in FIG. 3 when the effector 20 is fired from a launcher. The center body 24 moves out of the outer body 22 via a center body deployment mechanism via propellent within the center body 24, gas pressure generated by external burning propellent, explosive charges, etc.

When the center body 24 is in the deployed position shown in FIG. 3, the control surfaces 30 are moved from the folded position against the center body 24 to the deployed position away from the center body 24. The outer body 22 may also contain a ramjet fuel chamber 32 that is opened by the axial translation of the center body 24. The ramjet fuel chamber 32 may be formed as an axially extending chamber that is radially spaced from a longitudinal axis of the effector 20.

FIG. 2 shows a forward view of the effector 20 and a ramjet inlet 34 having ducting 36 that is defined by the outer body 22 and in fluid communication with the ramjet fuel chamber 32 when the ramjet fuel chamber 32 is opened by the axial translation of the center body 24. The movement of the center body 24 exposes the radially positioned ramjet fuel in the outer body 22, such that the air entering the ramjet inlet 34 may be heated by combusting the air with the fuel for additional fuel and thus propulsion of the effector 20. The ramjet inlet 34 may include at least one duct. For example, three ducts that are symmetrically disposed about a radially outer circumference of the ramjet inlet 34 may be suitable. The ramjet ducting 36 may be arranged proximate an aft portion 39 of the center body 24 and/or radially surround the aft portion 39 when the center body 24 is in the deployed position. The outer body 22 may surround the aft portion 39 of the center body 24 when the center body 24 is in the deployed position.

The effector 20 may also include a pusher plate 40 that is arranged at an aft end of the effector 20 for gun launched applications. The pusher plate 40 is configured to absorb force associated with the initial movement of the effector 20 in the gun barrel by the expanding gases and may push the effector 20 out of the barrel. After the center body 24 is moved to the deployed position, the pusher plate 40 is released from the effector 20 which consequently enables aft fins 41 to deploy as shown in FIG. 2. The pusher plate subsystem may be configured to apply a force that translates the center body 24 after launch.

Referring in addition to FIGS. 4 and 5, the center body 24 and the outer body 22 may have any suitable corresponding mechanical locking features to lock the center body 24 and the outer body 22 together after the center body 24 reaches the deployed position. As shown in FIG. 5, the outer body 22 and the center body 24 have corresponding interfaces 42, 44 that engage when the center body 24 moves. The corresponding interfaces 42, 44 may be formed as conical interfaces that taper in an axial direction. The interfaces 42, 44 may be integrally formed as one piece with the corresponding body.

Any number of interfaces 42, 44 may be provided and the interfaces 42, 44 may be circumferentially spaced about a longitudinal axis of the effector 20. The conical interfaces of the outer body 42 may be arranged at a forward end of the outer body 42 and the conical interfaces 44 of the center body 24 may be arranged at an aft end of the center body 24. The conical shape provides a play-free, self-locking, centering joint, such that when the center body 24 is extended, the center body 24 remains centered relative to the outer body 22. Other shapes for the interfaces may also be suitable.

The interfaces 42 and 44 have corresponding step shapes 52 and 54. The outer body interfaces 42 include forward-facing wedges, as shown at 56.

Referring in addition to FIGS. 6A-6D, the effector 20 may be launched from a barrel 46 of a gun-launched effector assembly by a propellant. FIG. 6A shows the effector 20 emerging from the barrel 46. As shown in FIG. 6B, after a muzzle exit of the effector 20, the center body 24 may be translated in the forward direction out from the outer body 22 as the effector 20 also moves in the forward direction. With reference to FIG. 6C, after the center body 24 is moved to the deployed position out of the outer body 22, the pusher plate 40 may be released from the effector 20 in the rearward direction and discarded from the effector 20. The movement of the pusher plate 40 may also enable the fins 41 of the effector 20 to deploy for flight of the effector 20, as shown in FIG. 6D.

The effector according to the present application is advantageous as compared with a conventional ramjet effector that does not have an extendable axial length or extended range. The effector according to the present application has an increased fuel length and weight as compared with known ramjets.

The effector according to the present application may be formed of any suitable materials and formed by any suitable manufacturing and assembly methods.

Although the disclosure includes certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An effector comprising:
   an outer body; and
   a center body movable from a stowed position, in which the center body is stowed in the outer body, to a deployed position, in which the center body extends out of the outer body to extend an axial length of the effector;
   further comprising a ramjet inlet having annular ducting into which intake air initially enters;
   wherein the annular ducting is defined by an outer surface of the center body and an inner surface of the outer body,
   wherein the annular ducting radially surrounds an aft end of the center body when the center body is moved to the deployed position; and
   wherein the annular ducting is arranged proximate the aft end of the center body when the center body is moved to the deployed position.

2. The effector according to claim 1, wherein an aft portion of the center body is arranged radially inwardly relative to the ramjet ducting and includes locking interfaces that engage with corresponding locking interfaces of the outer body when the center body is moved to the deployed position.

3. The effector according to claim 2, wherein the aft portion of the center body is surrounded by the outer body when the center body is in the deployed position.

4. The effector according to claim 2, wherein the ramjet inlet is in fluid communication with a ramjet fuel chamber arranged in the outer body when the center body is in the deployed position, and wherein the ramjet fuel is positioned radially outward from the center body.

5. The effector according to claim 1, wherein the center body includes deployable control surfaces that are deployed when the center body moves to the deployed position.

6. The effector according to claim 1, wherein the center body includes a plurality of subsystems of the effector.

7. The effector according to claim 1, wherein the center body moves in a forward direction relative to a direction of travel of the effector.

8. The effector according to claim 1, wherein an axial length of the center body is more than half of an axial length of the outer body.

9. The effector according to claim 1, further comprising a pusher plate that is released from an aft end of the effector after the center body moves to the deployed position.

10. The gun-launched effector assembly according to claim 9, wherein the effector includes fins that are arranged at the aft end of the effector and are deployed after the pusher plate is released.

11. An effector according to claim 1, wherein the center body is entirely contained within the outer body while in the stowed position.

12. The effector according to claim 1, wherein the center body and the outer body have corresponding interfaces that engage when the center body is moved to the deployed position to lock the center body and the outer body together.

13. An effector according to claim 12, wherein the interfaces of the outer body include forward-facing wedges.

14. An effector according to claim 1,
    wherein the center body and the outer body have corresponding interfaces that engage when the center body is moved to the deployed position to lock the center body and the outer body together; and wherein the air intake is circumferentially between interfaces of the outer body.

15. The effector according to claim 1, wherein the center body is axially translatable relative to the outer body.

16. The effector according to claim 1, wherein the effector includes a ramjet assembly.

17. The effector according to claim 16, wherein the outer body contains a ramjet fuel chamber that is opened when the center body is moved to the deployed position.

18. An effector according to claim 12, wherein the corresponding interfaces have corresponding step shapes.

19. The effector according to claim 12, wherein the corresponding interfaces are formed as conical interfaces that have a tapering shape in an axial direction.

20. The effector according to claim 19, wherein the conical interfaces are circumferentially spaced about a longitudinal axis of the effector.

21. The effector according to claim 19, wherein the conical interfaces of the outer body are arranged at a forward end of the outer body and the conical interfaces of the center body are arranged at an aft end of the center body.

22. A gun-launched effector assembly comprising:
a launcher; and
an effector that is fired from the launcher, the effector having an outer body and a center body that is movable from a stowed position, in which the outer body is stowed in the outer body, to a deployed position, in which the center body is moved out of the outer body to extend an axial length of the effector, the center body moving from the stowed position to the deployed position after a muzzle exit of the effector from the launcher;
wherein the effector further includes a ramjet inlet having annular ducting into which intake air initially enters;
wherein the annular ducting is defined by an outer surface of the center body and an inner surface of the outer body,
wherein the annular ducting radially surrounds an aft end of the center body when the center body is moved to the deployed position; and
wherein the annular ducting is arranged proximate the aft end of the center body when the center body is moved to the deployed position.

* * * * *